(12) United States Patent
Takahama et al.

(10) Patent No.: US 10,676,398 B2
(45) Date of Patent: Jun. 9, 2020

(54) SINTERED MATERIAL AND CUTTING TOOL INCLUDING SAME

(71) Applicant: SUMITOMO ELECTRIC HARDMETAL CORP., Itami-shi (JP)

(72) Inventors: Kazushi Takahama, Itami (JP); Yusuke Matsuda, Itami (JP); Satoru Kukino, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 16/069,113

(22) PCT Filed: Aug. 17, 2017

(86) PCT No.: PCT/JP2017/029504
§ 371 (c)(1),
(2) Date: Jul. 10, 2018

(87) PCT Pub. No.: WO2018/092369
PCT Pub. Date: May 24, 2018

(65) Prior Publication Data
US 2019/0002354 A1    Jan. 3, 2019

(30) Foreign Application Priority Data
Nov. 17, 2016   (JP) .................................. 2016-224087

(51) Int. Cl.
| | |
|---|---|
| *C04B 35/58* | (2006.01) |
| *C04B 35/5831* | (2006.01) |
| *C04B 35/645* | (2006.01) |
| *B23B 27/14* | (2006.01) |
| *C04B 35/626* | (2006.01) |
| *B23F 21/00* | (2006.01) |

(52) U.S. Cl.
CPC ........ *C04B 35/5831* (2013.01); *B23B 27/148* (2013.01); *C04B 35/6262* (2013.01); *C04B 35/6268* (2013.01); *C04B 35/62675* (2013.01); *C04B 35/62685* (2013.01); *C04B 35/645* (2013.01); *B23B 2226/125* (2013.01); *B23F 21/00* (2013.01); *C04B 2235/3843* (2013.01); *C04B 2235/3847* (2013.01); *C04B 2235/3852* (2013.01); *C04B 2235/3865* (2013.01); *C04B 2235/3886* (2013.01); *C04B 2235/402* (2013.01); *C04B 2235/404* (2013.01); *C04B 2235/405* (2013.01); *C04B 2235/5445* (2013.01); *C04B 2235/782* (2013.01); *C04B 2235/785* (2013.01); *C04B 2235/786* (2013.01); *C04B 2235/80* (2013.01); *C04B 2235/96* (2013.01)

(58) Field of Classification Search
CPC .............. C04B 35/5831; C04B 35/645; C04B 2235/80; C04B 2235/782; C04B 2235/3852; B23B 27/148; B23B 2226/125; B23F 21/00
See application file for complete search history.

(56) References Cited

U.S. PATENT DOCUMENTS

| | | | |
|---|---|---|---|
| 8,318,082 B2 * | 11/2012 | Can ..................... | C04B 35/5831 419/10 |
| 2008/0075543 A1 | 3/2008 | Zhu et al. | |
| 2013/0000213 A1 | 1/2013 | Okamura et al. | |
| 2013/0034712 A1 | 2/2013 | Kudoh et al. | |
| 2013/0309468 A1 | 11/2013 | Kudo | |
| 2014/0315015 A1 | 10/2014 | Fukushima | |
| 2015/0328691 A1 | 11/2015 | Okamura et al. | |
| 2016/0083301 A1 | 3/2016 | Sjogren et al. | |
| 2017/0297118 A1 | 10/2017 | Ishii et al. | |
| 2017/0341155 A1 | 11/2017 | Yano et al. | |

FOREIGN PATENT DOCUMENTS

| | | | | |
|---|---|---|---|---|
| EP | 1359130 | A1 | 11/2003 | |
| EP | 3437770 | A1 | 2/2019 | |
| JP | H01-122970 | A | 5/1989 | |
| JP | 2006-315898 | A | 11/2006 | |
| JP | 2006315898 | A * | 11/2006 | ............. C04B 35/58 |
| JP | 2016-074550 | A | 5/2016 | |
| JP | 2016-108232 | A | 6/2016 | |
| WO | 2016/052497 | A1 | 4/2016 | |
| WO | WO-2016052497 | A1 * | 4/2016 | ........... B23B 27/148 |

* cited by examiner

*Primary Examiner* — Noah S Wiese
(74) *Attorney, Agent, or Firm* — Baker Botts L.L.P.; Michael A. Sartori

(57) ABSTRACT

A sintered material includes cubic boron nitride grains and a binder, a grain size D50 of the cubic boron nitride grains when a cumulative value of the cubic boron nitride grains is 50% in an area-based grain size distribution being more than 0.5 μm and less than or equal to 5 μm, more than or equal to 70 volume % and less than or equal to 98 volume % of the cubic boron nitride grains being included in the sintered material, the binder being composed of $A_{1-x}Cr_xN$, where $0 \leq x \leq 1$, and a remainder, the remainder being composed of at least one of a first element and a compound including the first element and a second element, the first element being one or more elements selected from a group consisting of W, Co, Ni, Mo, Al, and Cr, the second element being one or more elements selected from a group consisting of nitrogen, carbon, oxygen, and boron.

7 Claims, No Drawings

SINTERED MATERIAL AND CUTTING TOOL INCLUDING SAME

TECHNICAL FIELD

The present invention relates to a sintered material and a cutting tool including the sintered material. The present application claims a priority based on Japanese Patent Application No. 2016-224087 filed on Nov. 17, 2016, the entire content of which is incorporated herein by reference.

BACKGROUND ART

In machining a sintered metal and a cast iron, a sintered material including cubic boron nitride is frequently used as a cutting tool. For example, Japanese Patent Laying-Open No. 2016-074550 (Patent Document 1) discloses a sintered material that has chipping resistance improved by setting a content ratio of cubic boron nitride at less than or equal to 70 volume % and that is therefore suitable for machining of a centrifugal cast iron. Japanese Patent Laying-Open No. 2006-315898 (Patent Document 2) discloses a cubic boron nitride sintered material that has wear resistance improved by defining the thickness of a binder phase and that is therefore suitable for high-speed machining of a sintered metal and a cast iron.

CITATION LIST

Patent Document

PTD 1: Japanese Patent Laying-Open No. 2016-074550
PTD 2: Japanese Patent Laying-Open No. 2006-315898

SUMMARY OF INVENTION

A sintered material according to one embodiment of the present disclosure is a sintered material including cubic boron nitride grains and a binder, a grain size D50 of the cubic boron nitride grains when a cumulative value of the cubic boron nitride grains is 50% in an area-based grain size distribution being more than 0.5 μm and less than or equal to 5 μm, more than or equal to 70 volume % and less than or equal to 98 volume % of the cubic boron nitride grains being included in the sintered material, the binder being composed of $Al_{1-x}Cr_xN$, where $0 \le x \le 1$, and a remainder, the remainder being composed of at least one of a first element and a compound including the first element and a second element, the first element being one or more elements selected from a group consisting of W, Co, Ni, Mo, Al, and Cr, the second element being one or more elements selected from a group consisting of nitrogen, carbon, oxygen, and boron.

A cutting tool according to one embodiment of the present disclosure is a cutting tool including the sintered material described above.

DETAILED DESCRIPTION

Problem to be Solved by the Present Disclosure

In machining a sintered metal and a cast iron, a higher content ratio of the cubic boron nitride is more desirable because it is necessary to suppress development of abrasive wear. In the sintered material disclosed in Patent Document 1, the content ratio of the cubic boron nitride is less than or equal to 70 volume %. Hence, it may be insufficient to suppress the development of abrasive wear. The cubic boron nitride sintered material disclosed in Patent Document 2 is not designed to have a binder phase with improved hardness. Hence, when machining a sintered metal and a cast iron, the binder phase is preferentially worn. Therefore, grains of the cubic boron nitride tend to be dropped to result in development of wear. Thus, there has not been obtained a sintered material that satisfies requirements for machining a sintered metal and a cast iron. Development of such a sintered material has been desired.

In view of the above, the present disclosure has an object to provide a sintered material and a cutting tool including the sintered material, by each of which development of abrasive wear can be suppressed when machining a sintered metal and a cast iron.

Advantageous Effect of the Present Disclosure

According to the description above, there can be provided a sintered material and a cutting tool including the sintered material, by each of which development of abrasive wear can be suppressed when machining a sintered metal and a cast iron.

DESCRIPTION OF EMBODIMENTS

First, embodiments of the present invention will be listed and described.

[1] A sintered material according to one embodiment of the present disclosure is a sintered material including cubic boron nitride grains and a binder, a grain size D50 of the cubic boron nitride grains when a cumulative value of the cubic boron nitride grains is 50% in an area-based grain size distribution being more than 0.5 μm and less than or equal to 5 μm, more than or equal to 70 volume % and less than or equal to 98 volume % of the cubic boron nitride grains being included in the sintered material, the binder being composed of $Al_{1-x}Cr_xN$, where $0 \le x \le 1$, and a remainder, the remainder being composed of at least one of a first element and a compound including the first element and a second element, the first element being one or more elements selected from a group consisting of W, Co, Ni, Mo, Al, and Cr, the second element being one or more elements selected from a group consisting of nitrogen, carbon, oxygen, and boron. According to such a configuration, the sintered material can suppress development of abrasive wear in machining a sintered metal and a cast iron.

[2] Preferably, the remainder further includes a compound including a third element and a fourth element, the third element is Ti, and the fourth element is one or more elements selected from a group consisting of nitrogen, carbon, oxygen, and boron. Accordingly, the development of abrasive wear can be suppressed more.

[3] Preferably, more than or equal to 17 volume % and less than or equal to 93 volume % of the $Al_{1-x}Cr_xN$ is included in the binder. Accordingly, the development of abrasive wear can be suppressed more.

[4] Preferably, $0.3 \le x \le 0.7$ is satisfied. Accordingly, the $Al_{1-x}Cr_xN$ having higher hardness is included, with the result that the development of abrasive wear can be suppressed further.

[5] Preferably, a grain size D90 of the cubic boron nitride grains when the cumulative value of the cubic boron nitride grains is 90% in the grain size distribution is more than or equal to 1 μm and less than or equal to 5 μm. Accordingly, the cubic boron nitride grains each having a grain size with which high hardness can be most required are included, with the result that the development of abrasive wear can be suppressed further.

[6] Preferably, more than or equal to 85 volume % and less than or equal to 95 volume % of the cubic boron nitride grains are included in the sintered material. Accordingly, the content ratio of the cubic boron nitride grains having high hardness is increased, with the result that the development of abrasive wear can be suppressed further.

[7] A cutting tool according to one embodiment of the present disclosure is a cutting tool including the sintered material described above. In the cutting tool thus configured, the development of abrasive wear can be suppressed in machining a sintered metal and a cast iron.

Details of Embodiments

The following describes an embodiment (hereinafter, also referred to as "the present embodiment") of the present invention more in detail.

Here, in the present specification, the expression "A to B" represents a range of upper to lower limits (i.e., more than or equal to A and less than or equal to B). When no unit is indicated for A and a unit is indicated only for B, the unit of A is the same as the unit of B. Moreover, when a compound or the like is expressed by a chemical formula in the present specification and an atomic ratio is not particularly limited, it is assumed that all the conventionally known atomic ratios are included. The atomic ratio should not be necessarily limited only to one in the stoichiometric range. For example, when "AlCrN" is described, an atomic ratio in the AlCrN is not limited to Al:Cr:N=0.5:0.5:1, and include all the conventionally known atomic ratios. Further, a metal element such as cobalt (Co), nickel (Ni), molybdenum (Mo), titanium (Ti), aluminum (Al), or chromium (Cr) and a non-metal element such as nitrogen (N), oxygen (O), or carbon (C) do not necessarily need to constitute a stoichiometric composition.

Further, in the present specification, whether "sinterability" is good or not is determined by determining whether or not a crack is visually confirmed at an external appearance of a sintered material and inside of the sintered material when the sintered material is produced by performing ultra-high pressure sintering onto a source material using a pressing apparatus. The inside of the sintered material appears at its external appearance when the sintered material is polished. Hence, the presence/absence of crack can be confirmed after the polishing. That is, the expression "sinterability is good" means that no crack is confirmed visually at the external appearance of the sintered material and the inside of the sintered material. The expression "sinterability is inferior" means that a crack is confirmed visually at at least one of the external appearance of the sintered material and the inside of the sintered material.

<<Sintered Material>>

A sintered material according to the present embodiment includes cubic boron nitride grains and a binder. A grain size D50 of the cubic boron nitride grains when a cumulative value of the cubic boron nitride grains is 50% in an area-based grain size distribution is more than 0.5 μm and less than or equal to 5 μm. More than or equal to 70 volume % and less than or equal to 98 volume % of the cubic boron nitride grains is included in the sintered material.

The binder is composed of $Al_{1-x}Cr_xN$, where $0 \leq x \leq 1$, and a remainder. The remainder is composed of at least one of a first element and a compound including the first element and a second element. The first element is one or more elements selected from a group consisting of W, Co, Ni, Mo, Al, and Cr, and the second element is one or more elements selected from a group consisting of nitrogen, carbon, oxygen, and boron.

In the sintered material according to the present embodiment, a peak intensity is detected in at least one of a (111) plane of cubic AlN, a (111) plane of CrN, and a (111) plane of $Al_{0.5}Cr_{0.5}N$ by an X-ray diffraction method. It should be noted that if the peak intensity is detected in a range of ±0.5° at 2θ in the (111) plane of $Al_{0.5}Cr_{0.5}N$, this is assumed as $Al_{1-x}Cr_xN$. With such a configuration, the sintered material according to the present embodiment can suppress development of abrasive wear in machining a sintered metal and a cast iron.

<Cubic Boron Nitride Grains>

(Grain Size)

The sintered material according to the present embodiment includes the cubic boron nitride grains (which may be hereinafter also referred to as "cBN grains") as described above. The cubic boron nitride grains are hard grains excellent in toughness and hardness. Therefore, as the content ratio of the cubic boron nitride grains is higher in the sintered material according to the present embodiment, the toughness and hardness are more improved. Further, the toughness and hardness of the sintered material according to the present embodiment are also improved when binding between boron in the cubic boron nitride grains and $Al_{1-x}Cr_xN$ becomes firm.

Grain size D50 of the cubic boron nitride grains when the cumulative value of the cubic boron nitride grains is 50% in the area-based grain size distribution is more than 0.5 μm and less than or equal to 5 μm. The sintered material including such cubic boron nitride grains becomes homogeneous as a whole because the grain sizes of the cubic boron nitride grains become similar, thus improving the hardness more. Preferably, grain size D50 of the cubic boron nitride grains is more than or equal to 0.7 μm and less than or equal to 3.8 μm. The term "area-based grain size distribution" means a grain size distribution determined by employing, as a reference, cross sectional areas of cubic boron nitride grains appearing at a cut surface of the sintered material according to the present embodiment as described below.

When grain size D50 of the cubic boron nitride grains is less than or equal to 0.5 μm, the cubic boron nitride grains become too small. Even if the grain sizes thereof are similar, the heat conductivity of the sintered material is decreased, with the result that the sintered material becomes likely to be thermally worn and cuttability tends to be decreased when used for a cutting tool. When grain size D50 of the cubic boron nitride grains becomes more than 5 μm, the cubic boron nitride grains become too large. Even if the grain sizes thereof are similar, irregularities are caused at a cutting edge ridgeline so as to correspond to the grain sizes when used for a cutting tool, with the result that burr tends to be significantly large in a workpiece.

A grain size D90 of the cubic boron nitride grains when the cumulative value of the cubic boron nitride grains is 90% in the above-described grain size distribution is preferably more than or equal to 1 μm and less than or equal to 5 μm. Accordingly, grain size D50 and grain size D90 of the cubic boron nitride grains become close to each other in numerical value, whereby the grain size of the cubic boron nitride grains of the sintered material becomes uniform and similar. Hence, the cubic boron nitride grains become greatly homogeneous as a whole, thus further improving the hardness. Preferably, grain size D90 of the cubic boron nitride grains is more than or equal to 1.7 m and less than or equal to 4.7 μm. Further, the absolute value of a difference between grain sizes D50 and D90 of the cubic boron nitride grains is preferably less than or equal to 1 μm to obtain uniform and similar grain sizes of the cubic boron nitride grains, whereby the hardness is further improved.

Grain sizes D50 and D90 of the cubic boron nitride grains are determined in the following manner. First, the sintered material according to the present embodiment is cut at a certain position and a sample including the cut surface is produced. The cut surface of the sintered material can be produced using one of a focused ion beam (FIB) apparatus or a cross section polisher apparatus.

Next, the cut surface of the sintered material is observed at ×2000 using a SEM (scanning electron microscope) to obtain a reflection electron image. The observation of this cut surface is performed not to include a vicinity of the surface of the sintered material (within 10 μm from the surface). This is due to the following reason. That is, a void may exist in the vicinity of the surface, which makes it difficult to uniquely determine the content ratio of the cubic boron nitride grains. Further, for example, when the sintered material is used for a cutting tool and is in contact with cemented carbide serving as a base material of this cutting tool, the observation of the cutting tool is performed not to include a range within 100 μm from an interface with the cemented carbide in the above-described cut surface. This is because a cemented carbide component such as WC may be dissolved in the interface region of the sintered material with the cemented carbide.

In the reflection electron image, a region with the cubic boron nitride grains is observed as a black region, whereas a region with the binder is observed as a gray region or a white region. In the gray region, a light element such as Al, Cr, or Co, exists. In the white region, a heavy element such as W exists. A boundary between the black region and the white or gray region can be specified by adjusting contrast and brightness in below-described image analysis software, thereby distinguishing between the black region and the white or gray region.

Further, the equivalent circle diameter of the black region in the reflection electron image is calculated using image analysis software (for example, product name: "WinROOF" provided by Mitani Corporation). By observing 5 or more visual fields, the equivalent circle diameters of more than or equal to 100 cubic boron nitride grains (black regions) are calculated. Then, the equivalent circle diameters are arranged from the minimum value to the maximum value to obtain a cumulative distribution. In the cumulative distribution, D50 represents a grain size corresponding to a cumulative area of 50% and D90 represents a grain size corresponding to a cumulative area of 90%. The term "equivalent circle diameter" means the diameter of a circle having the same area as the area of the cBN grain at the cut surface.

(Content Ratio)

More than or equal to 70 volume % and less than or equal to 98 volume % of the cubic boron nitride grains are included in the sintered material. Accordingly, the content ratio of the cubic boron nitride grains is increased to improve the hardness of the sintered material. When the content ratio of the cubic boron nitride grains in the sintered material becomes less than 70 volume %, the development of abrasive wear may be insufficiently suppressed. When the content ratio of the cubic boron nitride grains in the sintered material becomes more than 98 volume %, the content of the binder becomes too small, with the result that sinterability tends to be inferior, such as occurrence of a crack in the sintered material.

More than or equal to 85 volume % and less than or equal to 95 volume % of the cubic boron nitride grains are preferably included in the sintered material. Accordingly, in the sintered material, the content ratio of the cubic boron nitride grains is increased to the maximum to such an extent that the content of the binder does not become too small. Accordingly, the hardness is greatly improved. Thus, the development of abrasive wear can be suppressed the most in machining a sintered metal and a cast iron.

The content ratio (volume %) of the cubic boron nitride grains in the sintered material is determined in the following manner. First, in the same manner as in the above-described determination of the grain sizes of the cubic boron nitride grains, a sample including a cut surface of the sintered material is produced and a reflection electron image is obtained. Next, this reflection electron image is subjected to a binarization process using the above-described image analysis software so as to specify the black regions, thereby determining the occupying area of the cubic boron nitride grains. The calculated occupying area of the cubic boron nitride grains can be assumed as the occupying volume of the cubic boron nitride grains and can be used for the following formula (1) to determine the content ratio (volume %) of the cubic boron nitride grains in the sintered material:

(The content ratio of the cBN grains in the sintered material)=(the occupying area of the cBN grains)/(the entire area of the sintered material in the captured reflection electron image)×100    Formula (1).

In the present embodiment, it is assumed that images of 5 visual fields are captured, the content ratios (volume %) of the cBN grains in the sintered material are determined in the respective visual fields, and the content ratio (volume %) of the cubic boron nitride grains in the sintered material is represented by the average value thereof.

<Binder>

The binder is composed of $Al_{1-x}Cr_xN$ (where $0 \le x \le 1$) and the remainder. The remainder is composed of at least one of a first element and a compound including the first element and a second element. The first element is one or more elements selected from a group consisting of W, Co, Ni, Mo, Al, and Cr. The second element is one or more elements selected from a group consisting of nitrogen, carbon, oxygen, and boron. Since the hardness of the $Al_{1-x}Cr_xN$ phase is high, the sintered material including such a binder has high hardness as a whole. Further, even though the content ratio of the binder becomes low by increasing the content ratio of the cBN grains in the sintered material, the $Al_{1-x}Cr_xN$ phase allows for excellent sinterability.

Accordingly, the cBN grains can be prevented from being dropped and the development of abrasive wear can be suppressed. When one or both of the first element and the compound including the first and second elements is/are included as the remainder, the sinterability can be excellent, thus contributing to the prevention of dropping of the cBN grains and the suppression of the development of abrasive wear.

($Al_{1-x}Cr_xN$)

The binder includes $Al_{1-x}Cr_xN$ (where $0 \le x \le 1$) as described above. $Al_{1-x}Cr_xN$ has a cubic rock-salt crystal structure. The cubic rock-salt crystal structure, which is a crystal structure representative of a rock salt (sodium chloride), is a structure in which a face-centered cubic lattice is formed when chromium is dissolved in a solid state in the crystal structure of AlN with attention being paid to either of the two different types of atoms (Al, N), for example. Accordingly, a compound having such a cubic rock-salt crystal structure tends to have high hardness based on its crystal structure. Further, apart from a case where x is 0 (zero), $Al_{1-x}Cr_xN$ (which may be also referred to as "cAlCrN") has a structure in which chromium is dissolved in a solid state in the crystal structure of a cubic aluminum nitride (cAlN). Therefore, since the chromium is an element excellent in heat resistance, cAlCrN has a heat-resistant temperature higher than that of cAlN, apart from the case where x is 0 (zero). Hence, the sintered material including cAlCrN can have an excellent wear resistance in high-speed cutting.

Here, $0.3 \leq x \leq 0.7$ is preferably satisfied. If x is less than 0.3, the sintered material tends to be unable to exhibit an excellent wear resistance in high-speed cutting. This is presumably because the heat resistance of cAlCrN is not sufficiently improved if x is less than 0.3. On the other hand, if x is more than 0.7, the sintered material tends to be unable to exhibit an excellent wear resistance in high-speed cutting. This is presumably due to the following reason: if x is more than 0.7, the hardness of cAlCrN is decreased, so that the hardness of the sintered material is also decreased.

More than or equal to 17 volume % and less than or equal to 93 volume % of $Al_{1-x}Cr_xN$ is preferably included in the binder. Accordingly, the development of abrasive wear can be suppressed more. More than or equal to 34 volume % and less than or equal to 87 volume % of $Al_{1-x}Cr_xN$ is more preferably included in the binder. More than or equal to 58 volume % and less than or equal to 77 volume % of $Al_{1-x}Cr_xN$ is most preferably included in the binder. When the content ratio (volume %) of $Al_{1-x}Cr_xN$ in the binder falls within this range, particularly excellent wear resistance can be exhibited in high-speed cutting.

The content ratio (volume %) of $Al_{1-x}Cr_xN$ in the binder is specified using the following measurement method. First, the sintered material is subjected to analysis (XRD analysis) using the X-ray diffraction method to check whether or not there is a peak intensity of $Al_{1-x}Cr_xN$ in the binder. Specifically, the X-ray diffraction method is employed to check whether or not the peak intensity appears at one of the (111) plane of cubic AlN, the (111) plane of CrN, and the (111) plane of $Al_{0.5}Cr_{0.5}N$. When the peak intensity appears, it can be assumed that $Al_{1-x}Cr_xN$ is included therein. For example, the XRD analysis above is performed under the following conditions.

X-ray diffractometer: product name "SmartLab" provided by Rigaku
Characteristic X ray: Cu-Kα
Tube voltage: 45 kV
Tube current: 200 mA
X-ray diffraction method: θ-2θ method
X-ray irradiation range: a range having a diameter of about 0.3 mm is irradiated with X rays using a pinhole collimator.

After confirming that $Al_{1-x}Cr_xN$ is included, the sintered material is thinned to less than or equal to 0.1 μm using a focused ion beam (FIB) apparatus or an ion slicer. An HAADF (high-angle annular dark-field) image of the thinned sintered material is captured at a magnification of ×50000 using a scanning transmission electron microscope (STEM).

Next, in the same visual field as that of the HAADF image, EDX (Energy Dispersive X-ray spectrometry) is employed to create an element mapping (also referred to as "EDX image"), which is then overlaid on the above-described HAADF image. In this case, in the EDX image, all the regions in which Al and N are detected, Cr and N are detected, and Al, Cr and N are detected are assumed as the region of $Al_{1-x}Cr_xN$. Further, in the contrast appearing in the above-described HAADF image, a region corresponding to the region of $Al_{1-x}Cr_xN$ in the EDX image is assumed as the region of $Al_{1-x}Cr_xN$ in the HAADF image. However, when Al or Cr is detected in a region apparently determined to be the cBN grains in the EDX image, this region is not assumed as the region of $Al_{1-x}Cr_xN$. In this way, the occupying area of $Al_{1-x}Cr_xN$ in the HAADF image can be calculated.

Finally, from the occupying area of $Al_{1-x}Cr_xN$ in this HAADF image, the area of $Al_{1-x}Cr_xN$ in the entire binder (the occupying area of $Al_{1-x}Cr_xN$ in the binder) is calculated by using the reflection electron image used to measure the content ratio (volume %) of the cBN grains in the sintered material. By assuming this occupying area of $Al_{1-x}Cr_xN$ in the binder as the occupying volume of $Al_{1-x}Cr_xN$ in the binder and by calculating a ratio of the occupying volume of $Al_{1-x}Cr_xN$ in the binder to the volume of the entire binder, the content ratio (volume %) of $Al_{1-x}Cr_xN$ in the binder can be specified. It should be noted that four HAADF images (four visual fields) are used to specify the content ratio (volume %) of $Al_{1-x}Cr_xN$ in the binder. The average value of the values calculated from the four HAADF images is assumed as the content ratio (volume %) of $Al_{1-x}Cr_xN$ in the binder. It should be noted that for each of the four HAADF images, an HAADF image including a rectangular region of $Al_{1-x}Cr_xN$ with an area of more than or equal to 0.01 μm² is employed.

On the other hand, x in $Al_{1-x}Cr_xN$ is specified using the following measurement method. First, one of the four HAADF images is selected and all the rectangular portions each having an area of more than or equal to 0.01 μm² are extracted from the region of $Al_{1-x}Cr_xN$. Further, in the above-described EDX image, amounts of elements in the extracted portions corresponding to the region of $Al_{1-x}Cr_xN$ are measured to specify an atomic ratio of Al and Cr. Then, the same operation is performed onto each of the remaining three HAADF images to specify an atomic ratio of Al and Cr. From the average value of all the rectangular regions of these four images, x in $Al_{1-x}Cr_xN$ is specified.

As the remainder, the binder includes at least one of the first element and the compound including the first element and the second element. The first element is one or more elements selected from a group consisting of W, Co, Ni, Mo, Al, and Cr. The second element is one or more elements selected from a group consisting of nitrogen, carbon, oxygen, and boron. These elements and compounds exist at an interface between adjacent cBN grains in the sintered material and serve as the binder phase. Since the binder can bind the cBN grains to each other strongly, the sintered material can exhibit a more excellent wear resistance.

Examples of the above-described compounds usable herein include WC, $W_2Co_{21}B_6$, $AlB_2$, $Ni_3Al$, and the like. Among these, when at least one of WC and $W_2Co_{21}B_6$ is included as the remainder, the wear resistance of the sintered material is improved greatly.

Preferably, the remainder further includes a compound including a third element and a fourth element. The third element is Ti, and the fourth element is one or more elements selected from a group consisting of nitrogen, carbon, oxygen, and boron. These elements and compounds also exist at an interface between adjacent cBN grains in the sintered material and serve as the binder phase. Since the binder can bind the cBN grains to each other strongly, the sintered material can exhibit a more excellent wear resistance.

Examples of the above-described compounds include TiC, TiN, TiO$_2$, TiB$_2$, TiCN, and the like. Among these, when at least one of TiC and TiN is included as the remainder, the wear resistance of the sintered material is improved greatly.

<Minute Impurity>
(Concentration of Minute Impurity)

In addition to cBN, Al$_{1-x}$Cr$_x$N, the first element, and the compound including the first and second elements, the sintered material can include a minute impurity. The term "minute impurity" collectively refers to a small amount of element(s) and compound(s) that can be included in the source material of the sintered material or during the production thereof. The content (volume %) of each of the element(s) and compound(s) included as the minute impurity is more than or equal to 0 volume % and less than or equal to 5 volume %. A total of them (i.e., the content of the minute impurity) is more than or equal to 0 volume % and less than or equal to 5 volume %. Therefore, the minute impurity may be included in the sintered material or may not be included therein. Examples of the minute impurity include Li, Mg, Ca, Sr, Ba, Be, Si, Ga, La, Zr, V, Nb, Ta, Hf, Fe, Cu, and the like.

The content (volume %) of the minute impurity is calculated in the following manner. That is, the sintered material is melted by a molten salt method, and then each element in the sintered material is quantitatively measured using a high-frequency wave induction plasma emission spectrometry method (ICP method). In accordance with a result of the measurement, the content of each element serving as the minute impurity in the sintered material can be calculated based on volume % as a unit. However, in the calculation of the content of each of the above-described elements, it is assumed that Co, Al, and the like, which are components other than cBN and WC, are present as solely.

<Function>

According to the description above, since the content ratio of the cubic boron nitride grains is increased, the sintered material according to the present embodiment has high hardness and improved toughness. Further, the hardness of the binder is also improved by Al$_{1-x}$Cr$_x$N, and the sinterability becomes excellent even though the content ratio of the binder is low. Hence, the cBN grains are prevented from being dropped. Accordingly, the development of abrasive wear can be suppressed greatly in machining a sintered metal and a cast iron.

<<Method of Producing Sintered Material>>

The sintered material according to the present embodiment is preferably produced by the following production method. That is, the method of producing the sintered material includes: a step of preparing binder source material powder; a step of preparing cBN particles for sintering; and a step of obtaining a sintered material by mixing the binder source material powder with the cBN particles for sintering and sintering them. Further, the step of preparing the binder source material powder includes: a first step of obtaining a source material powder mixture including hexagonal AlN particles and hexagonal Cr$_2$N particles as well as one or both of the first element and the compound including the first element and the second element; a second step of obtaining a source material powder intermediate including cubic CrN particles by performing a thermal treatment onto the source material powder mixture; and a third step of obtaining the binder source material powder including Al$_{1-x}$Cr$_x$N (where 0≤x≤1) by treating the source material powder intermediate using a hydrostatic pressure synthetic method or an impulsive compression method.

<Step of Preparing Binder Source Material Powder>
(First Step)

In the first step, first, the hexagonal AlN (hereinafter also referred to as "hAlN") particles, the hexagonal Cr$_2$N (hereinafter, also referred to as "hCr$_2$N") particles, and one or both of the first element and the compound composed of the first and second elements are mixed using a ball mill apparatus or a bead mill apparatus, thereby obtaining a mixture. This mixture is pulverized such that the average particle size of the respective particles becomes less than or equal to 0.5 µm, thereby obtaining the source material powder mixture.

The average particle size of the particles of the source material powder mixture refers to a particle size D50 when a cumulative value of the particles is 50% in an area-based particle size distribution. The average particle size can be confirmed by measuring the pulverized mixture using a particle size distribution measuring apparatus such as a microtrac (for example, product name: "Microtrac MT3000EX" provided by Nikkiso).

(Second Step)

In the second step, the source material powder intermediate can be obtained which includes cubic CrN particles by performing the thermal treatment onto the source material powder mixture. As one example of the thermal treatment, the source material powder mixture is heated for 3 to 5 hours in a nitrogen atmosphere under conditions of more than or equal to 800° C. and less than or equal to 1100° C. Accordingly, hexagonal Cr$_2$N included in the source material powder mixture is changed into cubic CrN. An atomic ratio of CrN of the cubic CrN is as follows: Cr:N=1:1.

(Third Step)

In the third step, by treating the source material powder intermediate using the hydrostatic pressure synthetic method or the impulsive compression method, the binder source material powder including Al$_{1-x}$Cr$_x$N (where 0≤x≤1) can be obtained.

As the impulsive compression method, for example, the following method can be used: the source material powder intermediate is mixed with heat sink and copper powder serving as a pressure medium, and they are introduced into a steel container and are momentarily fed with a pressure of more than or equal to 15 GPa by way of a shock wave for a pressure application time of less than or equal to 50 microseconds. Accordingly, the hexagonal AlN included in the source material powder intermediate is changed into cubic AlN, and Cr is dissolved in a solid state in the cubic AlN, whereby cubic AlCrN, i.e., Al$_{1-x}$Cr$_x$N (where 0≤x≤1) can be synthesized. For the impulsive application of pressure, a pressure of more than or equal to 15 GPa and less than or equal to 50 GPa is preferable and a pressure of more than or equal to 35 GPa and less than or equal to 50 GPa is more preferable. A temperature during the impulsive application of pressure is preferably more than or equal to 1200° C. and less than or equal to 3000° C., and is more preferably more than or equal to 1800° C. and less than or equal to 2200° C.

In the third step, the binder source material powder obtained by the above-described treatment is preferably pulverized further into an average particle size of more than or equal to 0.1 µm and less than or equal to 0.5 µm using a ball mill apparatus or a bead mill apparatus. Accordingly, binder source material powder excellent in dispersibility can be prepared. The average particle size of the binder source material powder also refers to a particle size D50 when a cumulative value thereof is 50% in the area-based particle size distribution. The average particle size can be confirmed by measuring using the above-described particle size distribution measuring apparatus such as the microtrac.

<Step of Preparing cBN Particles for Sintering>

Next, in the step of preparing the cBN particles for sintering, the cBN particles for sintering can be prepared by mixing and pulverizing using a ball mill apparatus or a bead mill apparatus. The cBN particles for sintering are preferably sieved using a predetermined sieve to have a uniform particle size such that a particle size D50 of the particles when a cumulative value of the particles is 50% in an area-based particle size distribution is more than 0.5 µm and less than or equal to 5 µm and a particle size D90 of the particles when the cumulative value of the particles is 90% is more than or equal to 1 µm and less than or equal to 5 µm. In other words, the step of preparing the cBN particles for sintering preferably includes the sieving step as required. D50 and D90 of the cBN particles for sintering can be also checked by measuring the cBN particles for sintering using the above-described particle size distribution measuring apparatus such as the microtrac.

<Step of Obtaining Sintered Material>

Next, in the step of obtaining the sintered material, the binder source material powder and the cBN particles for sintering are mixed and are sintered, thereby obtaining the sintered material.

Specifically, for example, the binder source material powder and the cBN particles for sintering are mixed to obtain a mixture, and then this mixture is subjected to a sintering treatment at a pressure of more than or equal to 10 kPa and less than or equal to 15 GPa and a temperature of more than or equal to 800° C. and less than or equal to 1900° C., thereby obtaining the sintered material. This sintering treatment is preferably performed under a non-oxidizing atmosphere, and is more preferably performed in vacuum or under a nitrogen atmosphere. Although the sintering method should not be limited, spark plasma sintering (SPS), hot press, ultra-high pressure press, or the like can be used. Here, the content ratio (volume %) of the cBN particles in the mixture including the binder source material powder and the cBN particles for sintering is the same as the content ratio (volume %) of the cBN grains in the sintered material. That is, the content ratio (volume %) of the cBN particles before the sintering is the same as the content ratio (volume %) of the cBN grains after the sintering.

<<Cutting Tool>>

The sintered material according to the present embodiment is capable of suppressing development of abrasive wear in machining a sintered metal and a cast iron, and is therefore suitable for a cutting tool used for that purpose. That is, the cutting tool according to the present embodiment is a cutting tool including the above-described sintered material.

Examples of the cutting tool includes a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

The cutting tool may be entirely constituted of the sintered material of the present embodiment, or may be partially (for example, edge portion) constituted of the sintered material of the present embodiment. Moreover, a coating film may be formed on a surface of the cutting tool.

When the cutting tool is entirely composed of the above sintered material, the cutting tool can be produced by machining the sintered material into a desired shape. The sintered material can be machined by a laser, for example. When the cutting tool is partially composed of the above sintered material, the cutting tool can be produced by joining the sintered material to a desired position of a base body included in the tool. A method of joining the sintered material is not particularly limited; however, in order to suppress the sintered material from being separated from the base body, it is preferable to provide a joining layer between the base body and the sintered material to strongly couple the base body and the sintered material to each other.

EXAMPLES

While the present invention will be described below in more detail with reference to Examples, the present invention is not limited thereto.

Example 1

<Preparation of Binder Source Material Powder>

In order to prepare binder source material powders used for production of sintered materials of a sample 101 to a sample 114, source material powders shown in Table 1 below were prepared for the samples. Among these powders, each powder indicated by $Al_{1-x}Cr_xN$ (where x is 0.5) was obtained by mixing hexagonal AlN particles with hexagonal $Cr_2N$ particles at a predetermined ratio ($hAlN:hCr_2N=41:59$). Here, the hAlN is hexagonal AlN particles (product name: "aluminum nitride powder" provided by Tokuyama), and the $hCr_2N$ is hexagonal $Cr_2N$ particles (product name: "chromium nitride powder" provided by Japan New Materials).

Next, amounts of components in the source material powders corresponding to sample 101 to sample 114 were appropriately adjusted for the samples to obtain content ratios (volume %) of $Al_{1-x}Cr_xN$ in the binders as shown in Table 1, and the components were mixed to obtain mixtures. The mixtures were pulverized using a bead mill to each attain an average particle size of less than or equal to 0.5 µm, thereby obtaining source material powder mixtures corresponding to sample 101 to sample 114. Whether or not the average particle size of each of the source material powder mixtures is less than or equal to 0.5 µm can be checked using the above-described method employing the microtrac.

The above-described source material powder mixtures were thermally treated at 900° C. using a heating furnace having nitrogen introduced therein, thereby obtaining source material powder intermediates corresponding to sample 101 to sample 114. Further, each of the source material powder intermediates was mixed with a heat sink and copper powder, and was introduced into a steel container. Then, by way of explosion of an explosive, each of the source material powder intermediates was treated at a pressure of 40 GPa and a temperature of 2000° C., thereby obtaining the binder source material powders corresponding to sample 101 to sample 114. Next, each of these binder source material powders was pulverized using a bead mill to obtain an average particle size of less than or equal to 0.5 µm.

<Step of Preparing cBN Particles for Sintering>

In the step of preparing the cBN particles for sintering, cubic boron nitride powder was mixed and pulverized using a ball mill apparatus or a bead mill apparatus, and was sieved such that D50 and D90 of the particles became the particle sizes shown in Table 1. In this way, the cBN particles for sintering were prepared.

<Step of Obtaining Sintered Material>

In the step of obtaining the sintered material, the binder source material powder of each sample and the cBN particles for sintering were mixed such that the content ratio of the cBN grains in the sintered material would become the volume % shown in Table 1, was introduced into a capsule composed of tantalum, and was sintered, thereby obtaining the sintered material of each of sample 101 to sample 114. Specifically, the binder source material powder and the cBN particles for sintering were mixed to obtain a mixture, then this mixture was introduced into the above-described capsule, and a sintering treatment was performed onto this capsule using a pressing apparatus under a nitrogen atmosphere at a pressure of 7 GPa and a temperature of 1350° C. for 15 minutes, thereby obtaining the sintered material of each of sample 101 to sample 114.

<Measurement of Sintered Material>

The content ratio (volume %) of the cBN grains in the sintered material of each of sample 101 to sample 114 and grain sizes D50 and D90 of the cBN grains in the sintered material of each of sample 101 to sample 114 were measured in accordance with the measurement methods described above. Further, the sintered material of each of sample 101 to sample 114 was subjected to XRD analysis under the above-described conditions, thereby confirming that there was a peak intensity of $Al_{1-x}Cr_xN$ in the binder.

Next, the content ratio (volume %) of $Al_{1-x}Cr_xN$ in the binder and the value of x in $Al_{1-x}Cr_xN$ were also measured in accordance with the measurement methods described above. Results thereof are shown in Table 1. In the EDX analysis for each of the sintered materials, compositions included in addition to $Al_{1-x}Cr_xN$ were also measured.

<Evaluation>

(Cutting Test)

Each of the sintered materials of sample 101 to sample 114 was cut using a laser and was then finished to produce a cutting tool (cutting tool of each of sample 101 to sample 114) having a tool shape of TNGA160408 and a negative land of 15°×0.1 to 0.15 mm. Each of these cutting tools was used for a cutting test under below-described cutting conditions to measure an amount (μm) of flank wear after cutting for 4.5 km. Results thereof are shown in Table 1. It can be said that as the amount of flank face wear in Table 1 is smaller, the development of abrasive wear is more suppressed in machining a sintered metal.

Workpiece: sintered alloy for continuous cutting (unhardened material; material equivalent to SMF4040 [ISO5755 material specification: F-08C2])

Shape of the workpiece: cylindrical shape (outer diameter φ of 70; inner diameter φ of 25; and thickness of 60 mm)

Cutting speed: 200 m/minute

Depth of cut: 0.1 mm

Feed rate: 0.2 mm/rev

Coolant: wet type

Apparatus: NC lathe (product name: "LB-400" provided by OKUMA).

(Test Result)

In comparison among sample 101 to sample 114, the amounts of flank face wear of sample 102 to sample 107, sample 113, and sample 114 were excellent. In other words, the amounts of flank face wear were excellent in the sintered materials (cutting tools) in each of which the content ratio (volume %) of the cBN grains in the sintered material was at least 70 to 98 volume %, $Al_{1-x}Cr_xN$ was included in the binder, and the remainder of the binder was composed of the

TABLE 1

|  |  | cBN Particles | | | Binder | | | | Cutting Test Result |
| --- | --- | --- | --- | --- | --- | --- | --- | --- | --- |
|  |  | Content Ratio (vol %) | D50 (μm) | D90 (μm) | Source Material Powder (Components) | Content Ratio of $Al_{1-x}Cr_xN$ in Binder (vol %) | x | Sintered Material Compounds Detected by X Rays (EDX Analysis) | Width VB of Flank Wear (μm) |
| Comparative Example | Sample 101 | 60 | 0.9 | 1.7 | Co, WC, Al, $Al_{0.5}Cr_{0.5}N$ | 77 | 0.5 | cBN, $Al_{1-x}Cr_xN$, $W_2Co_{21}B_6$, WC, Co | 258 |
| Example | Sample 102 | 70 | 0.9 | 1.7 | Co, WC, Al, $Al_{0.5}Cr_{0.5}N$ | 77 | 0.5 | cBN, $Al_{1-x}Cr_xN$, $W_2Co_{21}B_6$, WC, Co | 201 |
| Example | Sample 103 | 80 | 0.9 | 1.7 | Co, WC, Al, $Al_{0.5}Cr_{0.5}N$ | 77 | 0.5 | cBN, $Al_{1-x}Cr_xN$, $W_2Co_{21}B_6$, WC, Co | 188 |
| Example | Sample 104 | 85 | 0.9 | 1.7 | Co, WC, Al, $Al_{0.5}Cr_{0.5}N$ | 77 | 0.5 | cBN, $Al_{1-x}Cr_xN$, $W_2Co_{21}B_6$, WC, Co | 175 |
| Example | Sample 105 | 90 | 0.9 | 1.7 | Co, WC, Al, $Al_{0.5}Cr_{0.5}N$ | 77 | 0.5 | cBN, $Al_{1-x}Cr_xN$, $W_2Co_{21}B_6$, WC, Co | 170 |
| Example | Sample 106 | 95 | 0.9 | 1.7 | Co, WC, Al, $Al_{0.5}Cr_{0.5}N$ | 77 | 0.5 | cBN, $Al_{1-x}Cr_xN$, $W_2Co_{21}B_6$, WC, Co | 172 |
| Example | Sample 107 | 98 | 0.9 | 1.7 | Co, WC, Al, $Al_{0.5}Cr_{0.5}N$ | 77 | 0.5 | cBN, $Al_{1-x}Cr_xN$, $W_2Co_{21}B_6$, WC, Co | 187 |
| Comparative Example | Sample 108 | 99 | 0.9 | 1.7 | Co, WC, Al, $Al_{0.5}Cr_{0.5}N$ | 77 | — | Cannot be Sintered due to Insufficient Amount of Binder. | — |
| Comparative Example | Sample 109 | 70 | 0.9 | 1.7 | Co, WC, Al | 0 | — | cBN, $W_2Co_{21}B_6$, WC, Co | 361 |
| Comparative Example | Sample 110 | 90 | 0.9 | 1.7 | Co, WC, Al, Cr | 0 | — | cBN, $W_2Co_{21}B_6$, WC, Co | 220 |
| Comparative Example | Sample 111 | 90 | 0.9 | 1.7 | TiC, $Al_{0.5}Cr_{0.5}N$ | 77 | 0.5 | cBN, $Al_{1-x}Cr_xN$, TiC | 226 |
| Comparative Example | Sample 112 | 90 | 0.9 | 1.7 | TiN, $Al_{0.5}Cr_{0.5}N$ | 77 | 0.5 | cBN, $Al_{1-x}Cr_xN$, TiN | 223 |
| Example | Sample 113 | 85 | 0.9 | 1.7 | Co, WC, TiC, $Al_{0.5}Cr_{0.5}N$ | 77 | 0.5 | cBN, $Al_{1-x}Cr_xN$, $W_2Co_{21}B_6$, WC, Co, TiC | 184 |
| Example | Sample 114 | 85 | 0.9 | 1.7 | Co, WC, TiN, $Al_{0.5}Cr_{0.5}N$ | 77 | 0.5 | cBN, $Al_{1-x}Cr_xN$, $W_2Co_{21}B_6$, WC, Co, TiN | 179 | first element (Co, Al) and the compound (WC) including the first element (W) and the second element (C). Also when TiC or TiN was further included in the binder, the wear resistance of the sintered material was improved greatly.

Example 2

<Preparation of Binder Source Material Powder>

In order to prepare binder source material powders used for production of sintered materials of a sample 201 to a sample 212, source material powders shown in Table 2 below were prepared for the samples. Among these powders, each powder indicated by $Al_{1-x}Cr_xN$ (where x is 0.5) was obtained by mixing hexagonal AlN particles and hexagonal $Cr_2N$ particles, which were same as those in Example 1, at a predetermined ratio (hAlN:h$Cr_2$N=41:59).

Next, amounts of components in the source material powders corresponding to sample 201 to sample 212 were appropriately adjusted for the samples to obtain content ratios (volume %) of $Al_{1-x}Cr_xN$ in the binders as shown in Table 2, and the components were mixed to obtain mixtures. The mixtures were pulverized using a bead mill to each attain an average particle size of less than or equal to 0.5 μm, thereby obtaining source material powder mixtures corresponding to sample 201 to sample 212. Then, by using the same method as that in Example 1, the binder source material powders corresponding to sample 201 to sample 212 were obtained.

<Step of Preparing cBN Particles for Sintering>

In the step of preparing the cBN particles for sintering, by using the same method as that in Example 1, the cBN particles for sintering were prepared such that D50 and D90 of the particles became the sizes shown in Table 2.

<Step of Obtaining Sintered Material>

In the step of obtaining the sintered material, by using the same method as that in Example 1, the binder source material powder of each sample and the cBN particles for sintering were mixed such that the content ratio of the cBN grains in the sintered material would become the volume % shown in Table 2, was introduced into a capsule composed of tantalum, and was sintered, thereby obtaining the sintered material of each of sample 201 to sample 212.

<Measurement of Sintered Material>

By using the same methods as those in Example 1, the content ratio (volume %) of the cBN grains in the sintered material of each of sample 201 to sample 212, grain sizes D50 and D90 of the cBN grains, the content ratio (volume %) of $Al_{1-x}Cr_xN$ in the binder, and the value of x in $Al_{1-x}Cr_xN$ were measured. In the EDX analysis for each of the sintered materials, compositions included in addition to $Al_{1-x}Cr_xN$ were also measured. Results thereof are shown in Table 2.

TABLE 2

| | | cBN Particles | | | Binder | | | Cutting Test |
|---|---|---|---|---|---|---|---|---|
| | | | | | | Content Ratio | | Result |
| | | Content Ratio (vol %) | D50 (μm) | D90 (μm) | Source Material Powder (Components) | of $Al_{1-x}Cr_xN$ in Binder (vol %) | x | Sintered Material Compounds Detected by X Rays (EDX Analysis) | Rz Life (km) |
| Comparative Example | Sample 201 | 91 | 1.9 | 2.9 | Co, WC, Al | 0 | — | cBN, $W_2Co_{21}B_6$, WC, Co | 6.4 |
| Example | Sample 202 | 91 | 1.9 | 2.9 | Co, WC, Al, $Al_{0.5}Cr_{0.5}N$ | 17 | 0.5 | cBN, $Al_{1-x}Cr_xN$, $W_2Co_{21}B_6$, WC, Co | 7.9 |
| Example | Sample 203 | 91 | 1.9 | 2.9 | Co, WC, Al, $Al_{0.5}Cr_{0.5}N$ | 34 | 0.5 | cBN, $Al_{1-x}Cr_xN$, $W_2Co_{21}B_6$, WC, Co | 8.2 |
| Example | Sample 204 | 91 | 1.9 | 2.9 | Co, WC, Al, $Al_{0.5}Cr_{0.5}N$ | 58 | 0.5 | cBN, $Al_{1-x}Cr_xN$, $W_2Co_{21}B_6$, WC, Co | 9.2 |
| Example | Sample 205 | 91 | 1.9 | 2.9 | Co, WC, Al, $Al_{0.5}Cr_{0.5}N$ | 77 | 0.5 | cBN, $Al_{1-x}Cr_xN$, $W_2Co_{21}B_6$, WC, Co | 10.7 |
| Example | Sample 206 | 91 | 1.3 | 1.9 | Co, WC, Al, $Al_{0.5}Cr_{0.5}N$ | 93 | 0.5 | cBN, $Al_{1-x}Cr_xN$, $W_2Co_{21}B_6$, WC, Co | 11 |
| Example | Sample 207 | 91 | 1.9 | 2.9 | Co, WC, Al, $Al_{0.5}Cr_{0.5}N$, Ni | 57 | 0.5 | cBN, $Al_{1-x}Cr_xN$, WC, Co | 10.5 |
| Example | Sample 208 | 91 | 1.9 | 2.9 | Co, WC, Al, $Al_{0.5}Cr_{0.5}N$, Ni, Mo | 87 | 0.5 | cBN, $Al_{1-x}Cr_xN$, WC, Co | 9.8 |
| Example | Sample 209 | 91 | 1.9 | 2.9 | Co, WC, Al, $Al_{0.5}Cr_{0.5}N$, Ni, Cr | 76 | 0.5 | cBN, $Al_{1-x}Cr_xN$, WC, Co | 10.3 |
| Example | Sample 210 | 70 | 1.9 | 2.9 | Co, WC, Al, $Al_{0.5}Cr_{0.5}N$ | 62 | 0.5 | cBN, $Al_{1-x}Cr_xN$, $W_2Co_{21}B_6$, WC, Co | 7.2 |
| Comparative Example | Sample 211 | 70 | 1.9 | 2.9 | Co, WC, Al | 0 | — | cBN, $W_2Co_{21}B_6$, WC, Co | 3.5 |
| Example | Sample 212 | 91 | 1.3 | 1.9 | Co, WC, Al, $Al_{0.5}Cr_{0.5}N$ | 97 | 0.5 | cBN, $Al_{1-x}Cr_xN$, $W_2Co_{21}B_6$, WC, Co | 7.1 |

<Evaluation>

(Cutting Test)

Each of the sintered materials of sample 201 to sample 212 was cut using a laser and was then finished to produce a cutting tool (cutting tool of each of sample 201 to sample 212) having a tool shape of TNGA160408 and a negative land of 15°×0.1 to 0.15 mm. A cutting test was performed using each of these cutting tools under below-described cutting conditions to measure a cutting distance until surface roughness Rz became coarser than 6.9 μm (Rz life (km)). Results thereof are shown in Table 2. It can be said that as the cutting distance is longer, the development of abrasive wear is more suppressed in machining a sintered metal.

Workpiece: gear component (unhardened material; end surface continuous machining; material equivalent to SMF4040 [ISO5755 material specification: F-08C2]) Shape of the workpiece: disc shape (outer diameter φ of 40; inner diameter φ of 20; thickness of 50 mm; the number of gears of 8)

Cutting speed: 210 m/minute
Depth of cut: 0.1 mm
Feed rate: 0.15 mm/rev
Coolant: wet type
Apparatus: NC lathe (product name: "LB-400" provided by OKUMA).

(Test Result)

In comparison among sample 201 to sample 212, the Rz life of each of sample 202 to sample 210 was excellent. In each of sample 202 to sample 210, $Al_{1-x}Cr_xN$ was included in the binder, and the content ratio thereof was in a range of 17 to 93 volume %.

Example 3

<Preparation of Binder Source Material Powder>

In order to prepare binder source material powders used for production of sintered materials of a sample 301 to a sample 309, source material powders shown in Table 3 below were prepared for the samples. Among these powders, powders indicated by $Al_{1-x}Cr_xN$ (where $0.2 \leq x \leq 0.8$) were obtained by mixing hexagonal AlN particles and hexagonal $Cr_2N$ particles, which were the same as those in Example 1, at predetermined ratios. Specifically, in the source material powder of sample 301, the hexagonal AlN particles and the hexagonal $Cr_2N$ particles were mixed at a ratio of 100:0. In the source material powder of sample 302, the hexagonal AlN particles and the hexagonal $Cr_2N$ particles were mixed at a ratio of 164:59. In the source material powder of sample 303, the hexagonal AlN particles and the hexagonal $Cr_2N$ particles were mixed at a ratio of 287:177. In the source material powder of sample 304, the hexagonal AlN particles and the hexagonal $Cr_2N$ particles were mixed at a ratio of 41:59. In the source material powder of sample 305, the hexagonal AlN particles and the hexagonal $Cr_2N$ particles were mixed at a ratio of 82:177. In the source material powder of sample 306, the hexagonal AlN particles and the hexagonal $Cr_2N$ particles were mixed at a ratio of 123:413. In the source material powder of sample 307, the hexagonal AlN particles and the hexagonal $Cr_2N$ particles were mixed at a ratio of 41:236. In the source material powder of sample 308, the hexagonal AlN particles and the hexagonal $Cr_2N$ particles were mixed at a ratio of 0:100.

Next, amounts of components in the source material powders corresponding to sample 301 to sample 309 were appropriately adjusted for the samples to obtain content ratios (volume %) of $Al_{1-x}Cr_xN$ in the binders as shown in Table 3, and the components were mixed to obtain mixtures. The mixtures were pulverized using a bead mill to each attain an average particle size of less than or equal to 0.5 μm, thereby obtaining source material powder mixtures corresponding to sample 301 to sample 309. Then, by using the same method as that in Example 1, the binder source material powders corresponding to sample 301 to sample 309 were obtained.

<Step of Preparing cBN Particles for Sintering>

In the step of preparing the cBN particles for sintering, by using the same method as that in Example 1, the cBN particles for sintering were prepared such that D50 and D90 of the particles became the sizes shown in Table 3.

<Step of Obtaining Sintered Material>

In the step of obtaining the sintered material, by using the same method as that in Example 1, the binder source material powder of each sample and the cBN particles for sintering were mixed such that the content ratio of the cBN grains in the sintered material would become the volume % shown in Table 3, was introduced into a capsule composed of tantalum, and was sintered, thereby obtaining the sintered material of each of sample 301 to sample 309.

<Measurement of Sintered Material>

By using the same methods as those in Example 1, the content ratio (volume %) of the cBN grains in the sintered material of each of sample 301 to sample 309, grain sizes D50 and D90 of the cBN grains, the content ratio (volume %) of $Al_{1-x}Cr_xN$ in the binder, and the value of x in $Al_{1-x}Cr_xN$ were measured. In the EDX analysis for each of the sintered materials, compositions included in addition to $Al_{1-x}Cr_xN$ were also measured. Results thereof are shown in Table 3.

TABLE 3

| | | cBN Particles | | | Binder | | | | Cutting Test |
|---|---|---|---|---|---|---|---|---|---|
| | | Content Ratio (vol %) | D50 (μm) | D90 (μm) | Source Material Powder (Components) | Content Ratio (vol %) of $Al_{1-x}Cr_xN$ in Binder | x | Sintered Material Compounds Detected by X Rays (EDX Analysis) | Result Burr Life (km) |
| Example | Sample 301 | 90 | 0.9 | 1.7 | Co, WC, Al, AlN | 66 | 0 | cBN, AlN, $W_2Co_{21}B_6$, WC, Co | 3.5 |
| Example | Sample 302 | 90 | 0.9 | 1.7 | Co, WC, Al, $Al_{0.8}Cr_{0.2}N$ | 66 | 0.2 | cBN, $Al_{1-x}Cr_xN$, $W_2Co_{21}B_6$, WC, Co | 3.7 |
| Example | Sample 303 | 90 | 0.9 | 1.7 | Co, WC, Al, $Al_{0.7}Cr_{0.3}N$ | 66 | 0.3 | cBN, $Al_{1-x}Cr_xN$, $W_2Co_{21}B_6$, WC, Co | 4.6 |
| Example | Sample 304 | 90 | 0.9 | 1.7 | Co, WC, Al, $Al_{0.5}Cr_{0.5}N$ | 66 | 0.5 | cBN, $Al_{1-x}Cr_xN$, $W_2Co_{21}B_6$, WC, Co | 4.8 |
| Example | Sample 305 | 90 | 0.9 | 1.7 | Co, WC, Al, $Al_{0.4}Cr_{0.6}N$ | 66 | 0.6 | cBN, $Al_{1-x}Cr_xN$, $W_2Co_{21}B_6$, WC, Co | 4.5 |
| Example | Sample 306 | 90 | 0.9 | 1.7 | Co, WC, Al, $Al_{0.3}Cr_{0.7}N$ | 66 | 0.7 | cBN, $Al_{1-x}Cr_xN$, $W_2Co_{21}B_6$, WC, Co | 4.4 |
| Example | Sample 307 | 90 | 0.9 | 1.7 | Co, WC, Al, $Al_{0.2}Cr_{0.8}N$ | 66 | 0.8 | cBN, $Al_{1-x}Cr_xN$, $W_2Co_{21}B_6$, WC, Co | 3.9 |
| Example | Sample 308 | 90 | 0.9 | 1.7 | Co, WC, Al, CrN | 66 | 1 | cBN, CrN, $W_2Co_{21}B_6$, WC, Co | 3.8 |
| Comparative Example | Sample 309 | 90 | 0.9 | 1.7 | Co, WC, Al | 0 | — | cBN, $W_2Co_{21}B_6$, WC, Co | 2.9 |

<Evaluation>
(Cutting Test)

Each of the sintered materials of sample 301 to sample 309 was cut using a laser and was then finished to produce a cutting tool (cutting tool of each of sample 301 to sample 309) having a tool shape of TNGA160408 and a negative land of 15°×0.1 to 0.15 mm. A cutting test was performed using each of these cutting tools under below-described cutting conditions to measure a cutting distance until the maximum height of the burr became higher than 0.1 μm (burr life (km)). Results thereof are shown in Table 3. It can be said that as the cutting distance is longer, the development of abrasive wear is more suppressed in machining a sintered metal.

Workpiece: gear component (unhardened material; end surface continuous machining; material equivalent to SMF4040 [ISO5755 material specification: F-08C2])

Shape of the workpiece: disc shape (outer diameter φ of 135; inner diameter φ of 60; thickness of 20 mm; the number of gears of 16)

Cutting speed: 260 m/minute
Depth of cut: 0.15 mm
Feed rate: 0.2 mm/rev
Coolant: dry type
Apparatus: NC lathe (product name: "LB-400" provided by OKUMA).

(Test Result)

In comparison among sample 301 to sample 309, the burr life of each of sample 301 to sample 308 was excellent. In each of sample 301 to sample 308, $Al_{1-x}Cr_xN$ (where, $0 \leq x \leq 1$) was included in the binder. In each of sample 303 to sample 306, x in $Al_{1-x}Cr_xN$ satisfied $0.3 \leq x \leq 0.7$, and the burr life in this case was particularly excellent.

Example 4

<Preparation of Binder Source Material Powder>

In order to prepare binder source material powders used for production of sintered materials of a sample 401 to a sample 407, source material powders shown in Table 4 below were prepared for the samples. Among these powders, each powder indicated by $Al_{1-x}Cr_xN$ (where x is 0.5) was obtained by mixing hexagonal AlN particles and hexagonal $Cr_2N$ particles, which were the same as those in Example 1, at a predetermined ratio (hAlN:h$Cr_2$N=41:59).

Next, amounts of components in the source material powders corresponding to sample 401 to sample 407 were appropriately adjusted for the samples to obtain content ratios (volume %) of $Al_{1-x}Cr_xN$ in the binders as shown in Table 4, and the components were mixed to obtain mixtures. The mixtures were pulverized using a bead mill to each attain an average particle size of less than or equal to 0.5 μm, thereby obtaining source material powder mixtures corresponding to sample 401 to sample 407. Then, by using the same method as that in Example 1, the binder source material powders corresponding to sample 401 to sample 407 were obtained.

<Step of Preparing cBN Particles>

In the step of preparing the cBN particles for sintering, by using the same method as that in Example 1, the cBN particles for sintering were prepared such that D50 and D90 of the particles became the sizes shown in Table 4.

<Step of Obtaining Sintered Material>

In the step of obtaining the sintered material, by using the same method as that in Example 1, the binder source material powder of each sample and the cBN particles for sintering were mixed such that the content ratio of the cBN grains in the sintered material would become the volume % shown in Table 4, was introduced into a capsule composed of tantalum, and was sintered, thereby obtaining the sintered material of each of sample 401 to sample 407.

<Measurement of Sintered Material>

By using the same methods as those in Example 1, the content ratio (volume %) of the cBN grains in the sintered material of each of sample 401 to sample 407, grain sizes D50 and D90 of the cBN grains, the content ratio (volume %) of $Al_{1-x}Cr_xN$ in the binder, and the value of x in $Al_{1-x}Cr_xN$ were measured. In the EDX analysis for each of the sintered materials, compositions included in addition to $Al_{1-x}Cr_xN$ were also measured. Results thereof are shown in Table 4.

TABLE 4

| | | cBN particles | | | Binder | | | Cutting Test |
| | | | | | | Content Ratio | | |
| | | Content Ratio (vol %) | D50 (μm) | D90 (μm) | Source Material Powder (Components) | (vol %) of $Al_{1-x}Cr_xN$ in Binder | x | Sintered Material Compounds Detected by X Rays (EDX Analysis) | Result Burr Life (km) |
|---|---|---|---|---|---|---|---|---|---|
| Comparative Example | Sample 401 | 93 | 0.5 | 0.8 | Co, WC, Al, $Al_{0.5}Cr_{0.5}N$ | 77 | 0.5 | cBN, $Al_{1-x}Cr_xN$, $W_2Co_{21}B_6$, WC, Co | 3 |
| Comparative Example | Sample 402 | 93 | 0.7 | 1.1 | Co, WC, Al | 0 | — | cBN, $W_2Co_{21}B_6$, WC, Co | 2.8 |
| Example | Sample 403 | 93 | 0.7 | 1 | Co, WC, Al, $Al_{0.5}Cr_{0.5}N$ | 77 | 0.5 | cBN, $Al_{1-x}Cr_xN$, $W_2Co_{21}B_6$, WC, Co | 6.3 |
| Example | Sample 404 | 93 | 1.9 | 2.8 | Co, WC, Al, $Al_{0.5}Cr_{0.5}N$ | 77 | 0.5 | cBN, $Al_{1-x}Cr_xN$, $W_2Co_{21}B_6$, WC, Co | 5.8 |
| Example | Sample 405 | 93 | 2.5 | 4.7 | Co, WC, Al, $Al_{0.5}Cr_{0.5}N$ | 77 | 0.5 | cBN, $Al_{1-x}Cr_xN$, $W_2Co_{21}B_6$, WC, Co | 5.3 |
| Example | Sample 406 | 93 | 3.8 | 5 | Co, WC, Al, $Al_{0.5}Cr_{0.5}N$ | 77 | 0.5 | cBN, $Al_{1-x}Cr_xN$, $W_2Co_{21}B_6$, WC, Co | 4.6 |
| Comparative Example | Sample 407 | 93 | 5.2 | 6 | Co, WC, Al, $Al_{0.5}Cr_{0.5}N$ | 77 | 0.5 | cBN $Al_{1-x}Cr_xN$, $W_2Co_{21}B_6$, WC, Co | 3.5 |

<Evaluation>

(Cutting Test)

Each of the sintered materials of sample 401 to sample 407 was cut using a laser and was then finished to produce a cutting tool (cutting tool of each of sample 401 to sample 407) having a tool shape of TNGA160408 and a negative land of 150×0.1 to 0.15 mm. A cutting test was performed using each of these cutting tools under below-described cutting conditions to measure a cutting distance until the maximum height of the burr became higher than 0.1 μm (burr life (km)). Results thereof are shown in Table 4. It can be said that as the cutting distance is longer, the development of abrasive wear is more suppressed in machining a sintered metal.

Workpiece: gear component (inductively hardened at its outer circumferential portion; end surface continuous machining; material equivalent to SMF4040 [ISO5755 material specification: F-08C2])

Shape of the workpiece: disc shape (outer diameter φ of 135; inner diameter φ of 60; thickness of 20 mm; the number of gears of 16)

Cutting speed: 100 m/minute
Depth of cut: 0.1 mm
Feed rate: 0.2 mm/rev
Coolant: wet type
Apparatus: NC lathe (product name: "LB-400" provided by OKUMA).

(Test Result)

In comparison among sample 401 to sample 407, the burr life of each of sample 403 to sample 406 was excellent. In each of sample 403 to sample 406, D50 of the cBN grains was in a range of 0.7 to 3.8 μm, D90 thereof was in a range of 1 to 5 μm. Further, $Al_{1-x}Cr_xN$ was included in the binder.

Heretofore, the embodiments and examples of the present invention have been illustrated, but it has been initially expected to appropriately combine configurations of the embodiments and examples.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A sintered material comprising cubic boron nitride grains and a binder,
    a grain size D50 of the cubic boron nitride grains when a cumulative value of the cubic boron nitride grains is 50% in an area-based grain size distribution being more than 0.5 μm and less than or equal to 5 μm,
    more than or equal to 80 volume % and less than or equal to 98 volume % of the cubic boron nitride grains being included in the sintered material,
    the binder being composed of $Al_{1-x}Cr_xN$, where $0 \leq x \leq 1$, and a remainder,
    the remainder being composed of at least one of a first element and a compound including the first element and a second element,
    the first element being one or more elements selected from a group consisting of W, Co, Ni, Mo, Al, and Cr,
    the second element being one or more elements selected from a group consisting of nitrogen, carbon, oxygen, and boron.

2. The sintered material according to claim 1, wherein
    the remainder further includes a compound including a third element and a fourth element,
    the third element is Ti, and
    the fourth element is one or more elements selected from a group consisting of nitrogen, carbon, oxygen, and boron.

3. The sintered material according to claim 1, wherein more than or equal to 17 volume % and less than or equal to 93 volume % of the $Al_{1-x}Cr_xN$ is included in the binder.

4. The sintered material according to claim 1, wherein $0.3 \leq x \leq 0.7$ is satisfied.

5. The sintered material according to claim 1, wherein a grain size D90 of the cubic boron nitride grains when the cumulative value of the cubic boron nitride grains is 90% in the area-based grain size distribution is more than or equal to 1 μm and less than or equal to 5 μm.

6. The sintered material according to claim 1, wherein more than or equal to 85 volume % and less than or equal to 95 volume % of the cubic boron nitride grains are included in the sintered material.

7. A cutting tool comprising the sintered material recited in claim 1.

* * * * *